US012792384B2

(12) United States Patent
Geckeler et al.

(10) Patent No.: US 12,792,384 B2
(45) Date of Patent: Nov. 10, 2026

(54) REBALANCING UNDER-UTILIZED VIRTUAL MACHINES IN HYPERSCALER ENVIRONMENTS

(71) Applicant: SAP SE, Walldorf (DE)

(72) Inventors: Florian Geckeler, Neustadt an der Weinstrasse (DE); Jannick Stephan Fahlbusch, Berlin (DE)

(73) Assignee: SAP SE, Walldorf (DE)

( * ) Notice: Subject to any disclaimer, the term of this patent is extended or adjusted under 35 U.S.C. 154(b) by 428 days.

(21) Appl. No.: 18/522,599

(22) Filed: Nov. 29, 2023

(65) Prior Publication Data

US 2025/0173173 A1 May 29, 2025

(51) Int. Cl.
*G06F 9/455* (2018.01)

(52) U.S. Cl.
CPC .. *G06F 9/45558* (2013.01); *G06F 2009/4557* (2013.01)

(58) Field of Classification Search
None
See application file for complete search history.

(56) References Cited

U.S. PATENT DOCUMENTS

2006/0085530 A1* 4/2006 Garrett ................ G06F 11/3495 714/E11.202
2010/0332657 A1* 12/2010 Elyashev ............ H04L 67/1001 709/226
2014/0082165 A1* 3/2014 Marr ..................... G06F 9/5044 709/222
2017/0315838 A1* 11/2017 Nidugala ............ H04L 43/0817
2018/0139148 A1* 5/2018 Gamage .................. G06F 9/445
2020/0117494 A1* 4/2020 Cortez ................ G06F 9/45558
2022/0121467 A1* 4/2022 Bonnal Conduzorgues ................ G06F 9/5072

OTHER PUBLICATIONS

K. S. B and S. K. R, "Load Balancing in Cloud Computing Environment," 2022 IEEE International Conference for Women in Innovation, Technology & Entrepreneurship (ICWITE), Bangalore, India, 2022, pp. 1-9. (Year: 2022).*
V. Chavan, p. Ravikant Kaveri, M. Peshkar and K. Dhole, "Clustering and Scheduling Tasks for Higher Utilization of Cloud Resources," 2020 International Conference on Computation, Automation and Knowledge Management (ICCAKM), Dubai, United Arab Emirates, 2020, pp. 386-390. (Year: 2020).*

* cited by examiner

*Primary Examiner* — Frank D Mills
(74) *Attorney, Agent, or Firm* — SCHWEGMAN LUNDBERG & WOESSNER, P.A.

(57) ABSTRACT

The disclosure presents techniques for optimizing the allocation of virtual machines (VMs) in a hyperscale cloud computing environment to enhance overall efficiency. The system comprises a VM agent operating within each VM environment, and a node agent running on each computing node. Both agents report utilization metrics to a central VM balancing service. This service processes the received metrics through either predefined rules or a pretrained machine learning model to evaluate VM utilization. Based on the analysis, the service identifies underutilized VMs that are candidates for migration. When a VM qualifies for migration and a suitable receiving node is available, the system generates and outputs a migration plan, aiming to improve resource utilization across the network.

20 Claims, 6 Drawing Sheets

REBALANCING UNDER-UTILIZED VIRTUAL MACHINES IN HYPERSCALER ENVIRONMENTS

TECHNICAL FIELD

The present application relates generally to virtual machine management and optimization in cloud computing environments, and more particularly to automated, utilization-based distribution of virtual machines across physical nodes in hyperscale data centers.

BACKGROUND

Cloud computing has revolutionized the delivery of information technology resources, allowing compute, storage, and network resources to be efficiently provisioned and managed at scale. A key enabling technology for cloud computing is server virtualization, which abstracts compute workloads from the underlying physical server infrastructure by running virtual machines ("VMs"). Major cloud providers operate massive hyperscale data centers containing thousands of servers (e.g., physical nodes) that host customer VMs. Here, a "hyperscale environment" or "hyperscale" data center refers to a data center architecture that is designed for horizontal scalability across hundreds or thousands of physical nodes. Accordingly, a "hyperscaler" refers to a cloud computing service provider that operates hyperscale data centers at massive scale to provide computing and storage capacity to customers on-demand.

Efficient utilization of data center capacity is a constant challenge for hyperscalers. Customers may over-provision VMs which then sit idle or underutilized. This stranded capacity is wasted. Meanwhile, other physical nodes may be overloaded if too many active VMs are packed onto a single node. Workload distribution across nodes is a manual, complex process.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
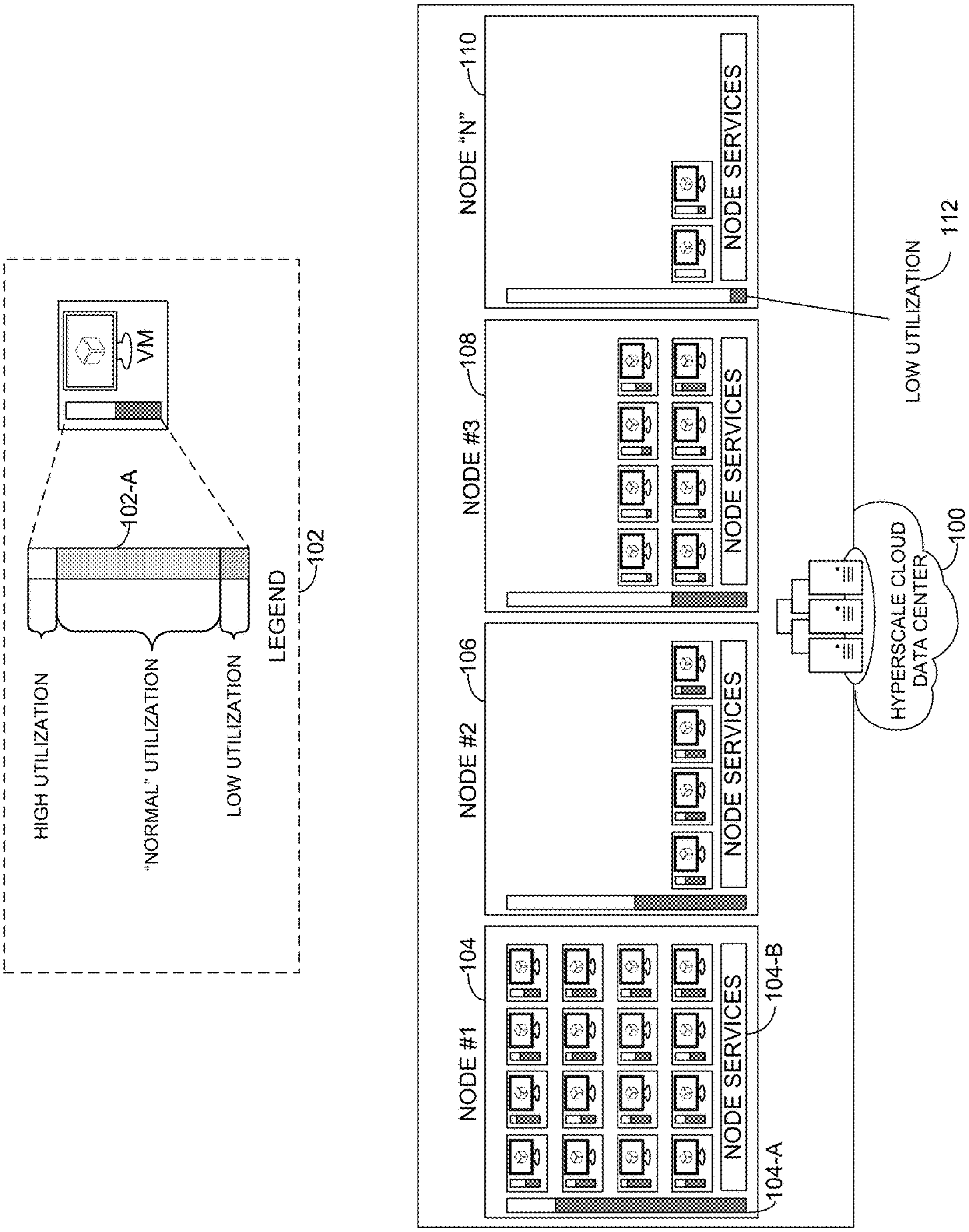
FIG. 1 shows a high-level overview of a hyperscale environment depicting multiple physical nodes with customer virtual machines ("VMs") distributed across the nodes, where some nodes have appropriate levels of resource utilization, while others have spare capacity.

Described herein are techniques for managing virtual machines ("VMs") on a plurality of physical nodes deployed in a hyperscale environment. The description that follows includes illustrative systems, methods, techniques, instruction sequences, and computing machine program products that embody illustrative embodiments. For purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In a hyperscale environment, a distinction can be made between servers that provide services dedicated to running the hyperscaler's internal services and operations, and servers that act as nodes for customer virtual machines. For purposes of the present disclosure, a "node" refers to a physical server on which customers of the hyperscaler can provision and deploy VMs and VM workloads. However, not all servers within a hyperscale environment are considered nodes. The hyperscale environment also contains servers dedicated to running the cloud provider's internal services and operations. These services servers provide functionality such as cloud control services, storage services, accounting and billing services, and virtualization management services that enable customers to interact with the nodes in the hyperscale environment. However, services servers, which are referred to herein simply as "servers", differ from "nodes" as the servers do not host customer VMs.

In modern hyperscale computing environments, customers can provision VMs to obtain on-demand compute resources. However, customers may deploy more VMs than necessary, in which case, one or more VMs on a physical node may be underutilized. Additionally, customers may provision one or more VMs on a physical node, but then forget to decommission unused VMs. This can lead to suboptimal utilization of resources across the physical nodes in the hyperscale environment.

Specifically, the workload on a VM may fluctuate significantly over time based on customer needs. During periods of low utilization, a VM may sit idle while still consuming a base level of physical resources on its allocated node. Meanwhile, other nodes in the environment may be operating near full utilization. This imbalance means the environment is overprovisioned despite having underutilized resources that could absorb additional workload if allocated efficiently.

The inefficient distribution of VMs can lead to increased costs, energy waste, and lost revenue for hyperscalers. However, existing technologies do not provide an automated way to monitor utilization at the node and VM level and seamlessly redistribute VMs to optimize utilization across all nodes, or more specifically, all nodes grouped together in a cluster of nodes.

Embodiments of the present invention provide a technical solution to this technical problem by leveraging software based VM agents and node agents to obtain utilization metrics for VMs and nodes, respectively, and a VM balancing service to analyze the utilization metrics to make determinations about VM migration plans for the migration of VMs from one node to another, with the end goal of increasing overall efficiency and decreasing costs.

Consistent with some embodiments, the VM balancing service executes on a server, distinct from the nodes that host customer VMs, and periodically receives via the VM agents and the node agents, VM utilization metrics and node utilization metrics. For example, a VM agent executing in a VM environment will periodically obtain one or more VM utilization metrics for the VM and then communicate the one or more VM utilization metrics over a network to the VM balancing service. Similarly, a node agent executing in a node environment will obtain one or more node utilization metrics for the respective node and communicate the one or more node utilization metrics over a network to the VM balancing service. In some instances, because some VMs may not have a dedicated VM agent, the node agent for the node on which the VM is running may obtain one or more VM utilization metrics for the VM without a VM agent, and the node agent will report the one or more VM utilization metrics to the VM balancing service. As the node agent is not operating in the VM environment, the VM utilization metrics that are accessible to the node agent may differ from those that are obtained and reported by a VM agent executing in a VM environment.

Upon receiving the various utilization metrics, the VM balancing service will analyze the utilization metrics to determine if one or more VMs are underutilized. As a general concern, this analysis involves comparing the one or more VM utilization metrics for a specific VM as received from the VM agent and/or node agent with one or more expected utilization metrics for that same VM. The expected utilization metrics for any particular VM may depend on a variety of factors, such as the configuration of the VM as provisioned by the customer. For example, when a customer provisions a new VM, the customer typically specifies the computing resources of a node that are required—such as number of CPU cores, amount of RAM, storage capacity, and so forth. Based on these VM configuration specifications, a set of expected utilization metrics can be calculated or derived for the VM. If a VM is provisioned with 4 CPU cores and 8 GB of RAM, the expected CPU utilization might be around 40% and the expected memory utilization around 80%, assuming typical workloads. These expected metrics provide a baseline for comparison.

Once a VM is up and running, the actual CPU, memory, storage, network, etc., utilization can be monitored by the VM agent and reported to the VM balancing service. By comparing the actual utilization metrics to the expected utilization metrics, the VM balancing service can determine if the VM is being underutilized. For instance, if the reported CPU usage for this 4 core VM is only averaging 10%, that indicates the VM is likely underutilized compared to the 40% expected CPU utilization. Similarly, if the memory usage is only 20% compared to the 80% expected, that also points to underutilization.

The expected utilization metrics provide a threshold-if the actual usage falls below the expected amount by a certain margin, then the VM may be considered a candidate to be migrated off the node. This allows for detecting stranded resources that could be used more efficiently elsewhere. The expected utilization metrics serve as a baseline tailored to the specific configuration of each VM. By leveraging the utilization metrics in analysis, the system can make optimization decisions based on how well each VM is utilizing its allocated resources, relative to its size and configuration as provisioned.

While the first stage of analysis involves examining the utilization metrics for each individual VM and comparing observed metrics to expected metrics to identify underutilized VMs, the second stage of analysis performed by the VM balancing service looks more holistically at node utilization levels to determine optimal consolidation. Specifically, the VM balancing service looks at the overall utilization of each node and counts how many VMs are identified as underutilized on that node from the first analysis stage. The goal is to consolidate the underutilized VMs onto fewer nodes, so nodes running far below capacity—that is, underutilized—can be powered down.

For example, a first node may have 10 VMs provisioned, but after the first analysis stage, 5 of those VMs are flagged as underutilized. Meanwhile, a second node has ample free capacity and is only running 2 VMs. During the second stage of the analysis, the VM balancing service recognizes that migrating the 5 underutilized VMs from Node A to Node B would allow Node A to be powered off, thereby improving overall utilization and efficiency. So, in the second stage, the VM balancing service generates a migration plan to migrate or shift the 5 underutilized VMs to Node B and shut down Node A.

By analyzing utilization at both the VM and node levels, the system can make informed consolidation decisions to optimize distribution across available nodes. The two-phase analysis allows detecting stranded resources at the VM level but also provides the flexibility to take a wider view and adjust workload allocation accordingly. Other aspects and advantages of the various embodiments of the present invention will be readily apparent from the description of the several figures that follows.

FIG. 1 shows a high-level overview of a hyperscale environment 100 depicting multiple physical nodes with customer VMs distributed across the nodes, where some nodes have a high utilization, while others have spare resource capacity. The hyperscale environment 100 consists of multiple physical nodes on which customers can and have provisioned VMs. Three example nodes are labeled as "NODE #1" 104, "NODE #2" 106, and "NODE #3" 108. An additional node is generically labeled as "NODE 'N'" 110 to indicate that a hyperscale environment contains a large number of nodes that can scale into the hundreds and even into the thousands. The nodes are the physical servers that provide compute, memory, storage, and networking resources allocated to customer VMs.

Each node runs node system services software (e.g., "NODE SERVICES") 104-B that facilitate the provisioning and operation of VMs on the node. The node services 104-B provide functionality such as virtualization management, storage management, networking, monitoring, and integration with the hyperscaler's overall management systems.

A legend 102 indicates an example bar 102-A depicting a measure of an overall utilization level of each node and VM. For instance, the length of the colored (e.g., grey) portion of the bar represents the degree of utilization on a relative scale. In general, a smaller or shorter bar reflects a lower utilization, whereas a bigger or taller bar reflects a higher overall utilization level. As shown in FIG. 1, each bar associated with a node or VM reflects a high-level visualization of the overall resource utilization of the respective node, and VM. In an actual implementation, the system may monitor and analyze a wide variety of fine-grained utilization metrics for each node and VM, such as percentage CPU usage, memory usage, storage I/O rates, network bandwidth usage, number of active processes, and other indicators of activity and resource consumption.

As shown in FIG. 1, the NODE #1 with reference number 104 has several VMs provisioned on the node. The utilization bar 104-A for the node 104 indicates that the node is experiencing high, but not complete, utilization. The several VMs on the node 104 show differing levels of utilization based on the colored bars.

The NODE #3 with reference number 108 is currently lightly utilized with only eight VMs, several of which are exhibiting light or low utilization. Similarly, the NODE "N" with reference number 110 has only two VMs, both exhibiting low utilization 112. The light utilization of NODE #3 108 and NODE "N" 110 illustrates how VM distribution can be imbalanced. Despite NODE #3 108 and NODE "N" 110 being underutilized, other nodes like NODE #1 are operating with high utilization and cannot absorb additional workload. This prevents fully utilizing available resources.

Each node has a baseline power consumption even when idle, stemming from the energy needed to power the node itself and run basic operating system and management software. The power draw increases incrementally as additional customer VMs are provisioned on the node and consume more compute, memory, storage, and network resources.

Having several lightly loaded nodes with just a few VMs can be inefficient from a power perspective. The nodes are still drawing baseline power, but little incremental power is being used for customer workloads. Consolidating underutilized VMs onto fewer nodes allows powering down unused nodes to save on power costs.

Here, as illustrated in FIG. 1, the system can optimize the allocation of VMs by consolidating the two underutilized VMs from NODE "N" 110 onto NODE #3 108. Because NODE #3 108 has ample spare resource capacity, migrating the two VMs from NODE "N" 110 to NODE #3 108 would allow shutting down NODE "N" entirely. This would allow reducing power consumption by turning off unused nodes like NODE "N". At the same time, consolidating multiple underutilized VMs together on NODE #3 108 allows that node to operate at a higher utilization level. The end result is that workload is shifted onto fewer nodes running at higher utilization, while nodes no longer needed are powered down. This balances performance and efficiency across the hyperscale environment.

Figure 2:
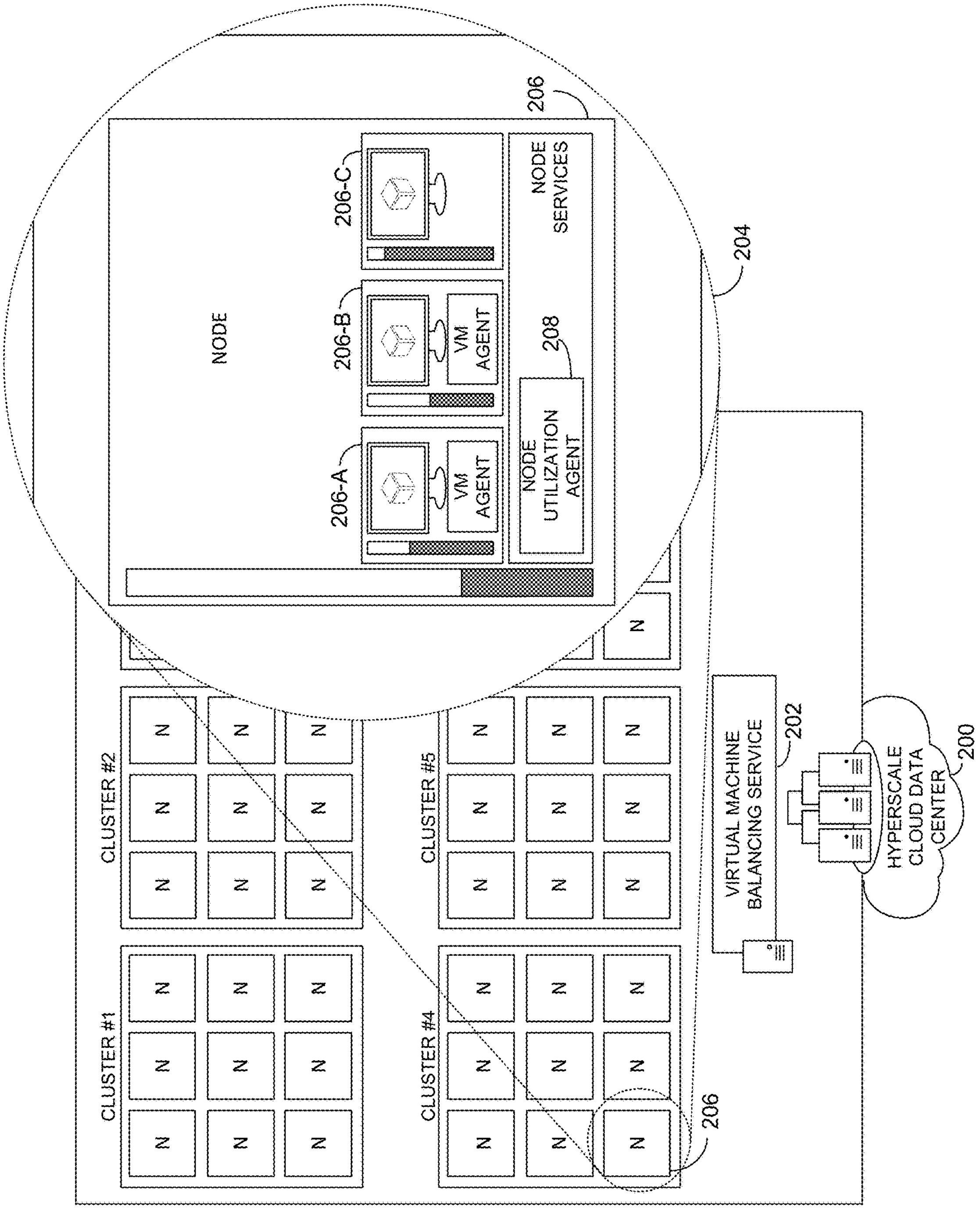
FIG. 2 shows a high-level overview of a hyperscale environment, consistent with some embodiments, depicting a server executing a VM balancing service that receives and processes node and VM utilization metrics to make determinations about the migration of VMs from one node to another.

FIG. 2 shows a high-level overview of a hyperscale environment 200, consistent with some embodiments, depicting a server 202 executing a VM balancing service that receives and processes node and VM utilization metrics to make determinations about the migration of VMs from one node to another. The hyperscale environment 200 contains multiple physical nodes organized into clusters based on common hardware configurations. For example, the cluster identified as "CLUSTER #1" may contain nodes with a common hardware and resource configuration, for example, optimized for computationally intensive workloads. Similarly, the cluster identified as CLUSTER #2 may contain nodes with a common hardware and resource configuration optimized for memory intensive workloads. Other clusters may be defined for different purposes, such as GPU acceleration for machine learning tasks, and so forth.

The circle 204 illustrates a zoomed-in or detail view of the node 206. On the node 206, there are three VMs 206-A, 206-B, and 206-C. The first two VMs 206-A and 206-B include VM agents. Each VM agent monitors resource consumption of the VM and reports corresponding utilization metrics to the VM balancing service. As shown in FIG. 2, on the node 206, a node utilization agent 208 executes as part of the node services. The node utilization agent 208, also referred to herein more simply as a node agent, monitors resource consumption at the node level. The node agent 208 periodically reports node-level utilization metrics to the VM balancing service 202 executing on a server. Additionally, as some VMs may not be configured and provisioned to include a VM agent, the node agent 208 will monitor the resource consumption of these VMs (i.e., those without VM agents) and report back to the VM balancing service the utilization metrics for these VMs.

The VM balancing service 202 contains a VM analyzer component that processes the incoming VM-level utilization metrics. The VM balancing service 202 also contains a node analyzer component that processes the incoming node-level utilization metrics. By analyzing the utilization metrics at both the VM and node levels, the service 202 determines when and how VMs should be migrated between nodes to optimize utilization across the hyperscale environment 200. When the VM balancing service 202 identifies VMs that need to be migrated based on underutilization, the service 202 transmits instructions to implement the migration. This allows consolidating workload onto fewer nodes and powering down unused nodes to save power and reduce costs.

In some embodiments, the analysis performed by the VM balancing service 202 is based on highly customizable rulesets that can be tailored on a per-cluster basis. The thresholds and logic for determining when a VM is considered underutilized may differ across clusters, as the hardware configuration optimizes each cluster for different VM workloads.

For example, a cluster with nodes optimized for computationally intensive VM workloads may utilize CPU resources at a much higher rate than a cluster with nodes optimized for memory intensive workloads. As such, the criteria for CPU underutilization that triggers VM migration on the computation cluster may be 60% usage, whereas on the memory intensive cluster it may be 30%. The VM balancing service 202 allows for defining distinct rules and thresholds for each cluster accounting for their hardware differences. This allows optimized, workload specific VM balancing unique to each cluster's intended function.

Figure 3:
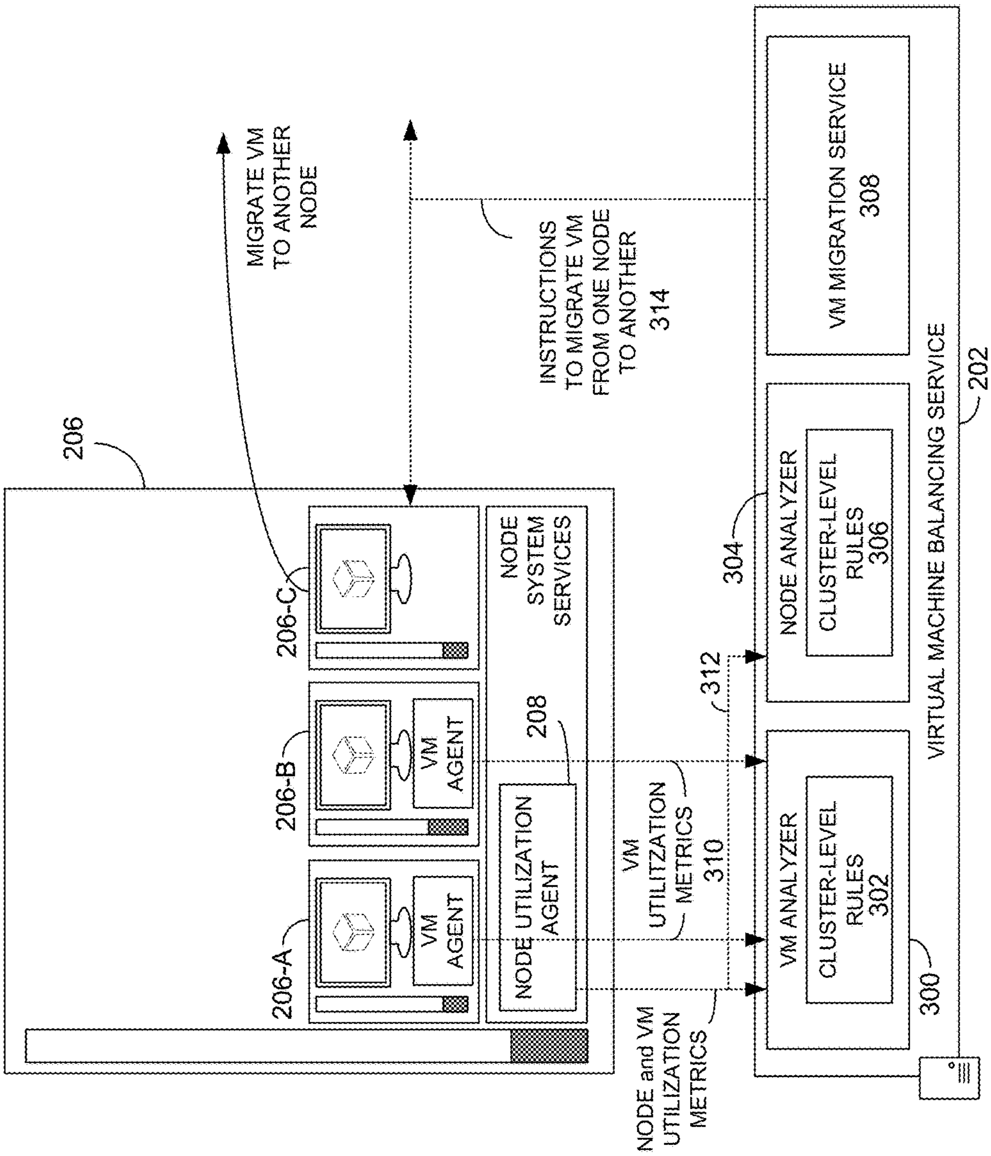
FIG. 3 illustrates a more detailed view of the hyperscale environment and the VM balancing service architecture, according to some embodiments.

FIG. 3 illustrates a more detailed view of the hyperscale environment and the VM balancing service architecture, according to some embodiments. As shown in FIG. 3, the VM balancing service 202 contains three main components: the VM analyzer 300, the node analyzer 304, and the VM migration service 308. The VM analyzer 300 receives VM utilization metrics 310 from two sources. The first source is directly from VM agents executing on select customer VMs, and the second source is from the node agents (e.g., node utilization agent 208), for VMs that do not have a VM agent, such as the VM with reference number 206-C.

Consistent with some embodiments, the VM analyzer 300 contains cluster-level rules 302 that are applied during analysis to determine if a VM is underutilized. The rules 302 are specific to each cluster, meaning different criteria for underutilization may be defined depending on the hardware configuration of the nodes in a given cluster. When the VM analyzer 300 receives VM utilization metrics 310 for a particular VM, it identifies the cluster that the VM's host node belongs to. It then applies the rules 302 defined for that cluster to the VM's utilization metrics 310 to determine if the VM is underutilized. For example, a VM running on a node in a first cluster, optimized for computation intensive tasks, may have a CPU utilization rule that triggers migration at a different threshold than a VM running on a node in a second cluster, with hardware resources optimized for memory heavy tasks. Similarly, a VM in a cluster optimized for memory heavy tasks may have a rule triggering migration at a utilization threshold that is different than a VM running on a node in a different cluster, with hardware optimized for machine learning tasks. By applying cluster-specific rules 302, the VM analyzer 300 can make optimization decisions tailored to the intended function of each cluster.

In some embodiments, the determination of whether a VM is underutilized is made by inputting the VM's utilization metrics into a pre-trained machine learning model. The model is trained on historical utilization data from many VMs with the same configuration and node type. The training data is labeled to indicate whether the VM was underutilized during each measurement period. By learning from many examples, the machine learning model can determine patterns and thresholds in the metrics that indicate a VM is being underutilized. When presented with new utilization metrics for a VM, the pre-trained model can generate a score predicting the likelihood that the VM should be migrated based on the input metrics. If the score exceeds a threshold, the VM is flagged as underutilized. The machine learning approach allows customizing the underutilization criteria in a data-driven way for different VM configurations.

The node analyzer 304 serves to evaluate node utilization across the hyperscale environment when making VM migration decisions. It contains cluster-level rules 306 that define different criteria for each cluster. The node analyzer 304 receives the node utilization metrics 312 for all nodes across the environment. It identifies which cluster each node belongs to. It then applies the rules 306 defined for that cluster to the node's utilization metrics to determine if the node is underutilized.

For example, the rules 306 may specify different node utilization thresholds to trigger migration for computation clusters versus memory clusters, based on their intended workloads. The node analyzer aggregates the node utilization metrics across all nodes in a cluster and analyzes the metrics using the applicable rules 306. If the metrics indicate the cluster is underutilized overall, meaning VM workloads could be consolidated, then the node analyzer 304 will output instructions to migrate underutilized VMs accordingly. The configurable cluster-based rules 306 allow the node analyzer 304 to make optimization decisions tailored to the specific hardware resources and intended usage of each cluster. As with the VM analyzer, with some embodiments, a machine learning approach may be taken to assess the utilization level of individual nodes, based on their respective node utilization metrics. By analyzing nodes relative to their clusters, the VM balancing service can rebalance utilization based on actual observed usage patterns.

By collecting metrics at both the node and VM level, the VM balancing service 202 can make informed decisions about when and where to migrate VMs to better utilize capacity. The VM analyzer 300 applies logic to determine when a specific VM is underutilized and should be migrated off its current node. The node analyzer 304 applies logic to evaluate node utilization across the environment and identify which nodes have capacity to absorb migrated VMs. The VM migration service 308 then combines the output of the VM analyzer and node analyzer to generate a migration plan. The VM migration service 308 transmits instructions 314 to implement the migration plan, triggering the actual migration of one or more VMs from their original nodes to new destinations.

Figure 4:
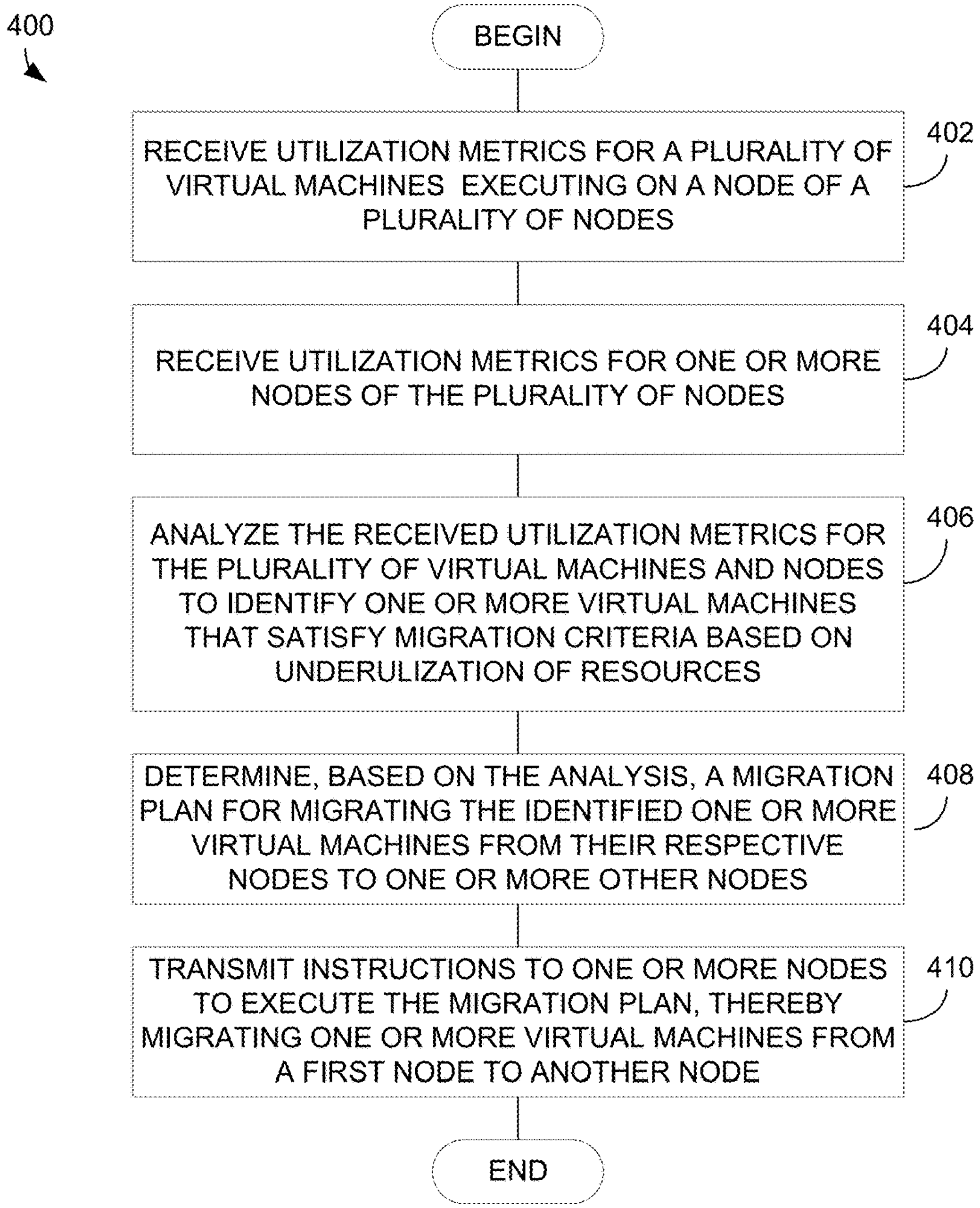
FIG. 4 is a flow diagram illustrating a method, in accordance with an example embodiment.

FIG. 4 is a flow diagram illustrating a method 400, in accordance with an example embodiment, for managing virtual machines across nodes in a hyperscale environment. The method begins at operation 402, when the VM balancing service receives utilization metrics for multiple VMs executing on a node. These VM utilization metrics may be received directly from a VM agent, executing within the VM environment of the VM, or via a node agent, executing within the node environment of the node. Next, at operation 404, node utilization metrics are received for one or more nodes. These node utilization metrics are received from node agents executing within the node environment of their respective nodes.

At operation 406, the VM and node utilization metrics are analyzed by the VM balancing service to identify VMs that satisfy migration criteria based on underutilization of resources. The analysis involves applying rules and algorithms to the observed usage metrics by comparing the observed usage metrics to expected metrics, to determine when a VM is inactive, underutilized, or otherwise wasting resources on its current node.

At operation 408, based on the VM analysis, a migration plan is determined for migrating the identified inactive VMs to other nodes. This involves evaluating the capacity and utilization of other nodes to find suitable destinations for absorbing the migrated VMs.

Finally, at operation 410, the VM migration service of the VM balancing service transmits instructions to the node service of one or more nodes, to implement the migration plan, thereby triggering the migration of one or more VMs from their original node to a new destination node. The method illustrated in FIG. 4 may be performed periodically, based on a predetermined schedule, or as needed, to continually monitor utilization at both the VM and node level and perform periodic rebalancing through selective VM migration.

In view of the disclosure above, various examples are set forth below. One or more features of an example, taken in isolation or combination, should be considered within the disclosure of this application.

Example 1 is a computer-implemented method for managing virtual machines ("VMs") executing across a plurality of nodes in a data center, the method comprising: receiving, by a VM balancing service executing on a server, i) utilization metrics for a plurality of VMs provisioned for and executing on a node of the plurality of nodes, and ii) utilization metrics for the plurality of nodes; analyzing, by the VM balancing service, the received utilization metrics for the plurality of VMs and nodes to identify one or more VMs that satisfy migration criteria based on underutilization of resources; determining, by the VM balancing service, based on the analyzing, a migration plan for migrating the identified one or more VMs from their respective nodes to one or more other nodes; and transmitting, by the VM balancing service, instructions to implement the migration plan, wherein the instructions cause migration of at least one identified VM from a first node to a second node.

In Example 2, the subject matter of Example 1 includes, wherein analyzing the received utilization metrics for the plurality of VMs comprises: comparing, for each of the plurality of VMs, the received utilization metrics for the VM against expected utilization metrics for the VM based on specifications of the virtual machine; identifying a VM as satisfying the migration criteria when the received utilization metrics for the VM deviate from the expected utilization metrics for the VM beyond a threshold amount.

In Example 3, the subject matter of Examples 1-2 includes, wherein analyzing the received utilization metrics for the plurality of VMs comprises: inputting the received utilization metrics for an individual VM into a pre-trained machine learning model; generating, by the pre-trained machine learning model, a migration score indicating a likelihood that the individual VM should be migrated to a new node based on the inputted utilization metrics; identifying the individual VM as satisfying the migration criteria when the migration score exceeds a threshold value; wherein the pre-trained machine learning model is trained using historical utilization metrics for a plurality of VMs having the same configuration and node configuration as the individual VM.

In Example 4, the subject matter of Examples 1-3 includes, wherein the migration criteria are further based on an overall utilization level of the node on which the VM is executing, such that migration is triggered when the node utilization is below a threshold.

In Example 5, the subject matter of Examples 1-4 includes, wherein determining the migration plan comprises: identifying multiple VMs on the first node that satisfy the migration criteria; selecting the second node from the plurality of nodes based on the second node having available resources to accommodate the multiple VMs.

In Example 6, the subject matter of Examples 1-5 includes, wherein nodes in the plurality of nodes are organized into clusters based on common hardware configurations, and wherein the migration criteria are specific to a cluster.

In Example 7, the subject matter of Example 6 includes, wherein a first cluster contains nodes optimized for computationally intensive workloads, and wherein the migration criteria for the first cluster prioritizes CPU and memory utilization metrics.

In Example 8, the subject matter of Examples 1-7 includes, wherein the utilization metrics for the plurality of VMs are received from VM agents executing on at least some of the plurality of VMs and from node agents executing on the nodes on which the plurality of VMs are executing.

Example 9 is a system for managing virtual machines ("VMs") executing across a plurality of nodes in a data center, the system comprising: a memory storing instructions; one or more processors configured to execute the instructions to perform operations comprising: receiving utilization metrics for a plurality of VMs provisioned for and executing on a node of the plurality of nodes, and utilization metrics for the plurality of nodes; analyzing the received utilization metrics for the plurality of VMs and nodes to identify one or more VMs that satisfy migration criteria based on underutilization of resources; determining, based on the analyzing, a migration plan for migrating the identified one or more VMs from their respective nodes to one or more other nodes; and transmitting instructions to implement the migration plan, wherein the instructions cause migration of at least one identified VM from a first node to a second node.

In Example 10, the subject matter of Example 9 includes, wherein analyzing the received utilization metrics for the plurality of VMs comprises: comparing, for each of the plurality of VMs, the received utilization metrics for the VM against expected utilization metrics for the VM based on specifications of the virtual machine; identifying a VM as satisfying the migration criteria when the received utilization metrics for the VM deviate from the expected utilization metrics for the VM beyond a threshold amount.

In Example 11, the subject matter of Examples 9-10 includes, wherein analyzing the received utilization metrics for the plurality of VMs comprises: inputting the received utilization metrics for an individual VM into a pre-trained machine learning model; generating, by the pre-trained machine learning model, a migration score indicating a likelihood that the individual VM should be migrated to a new node based on the inputted utilization metrics; identifying the individual VM as satisfying the migration criteria when the migration score exceeds a threshold value; wherein the pre-trained machine learning model is trained using historical utilization metrics for a plurality of VMs having the same configuration and node configuration as the individual VM.

In Example 12, the subject matter of Examples 9-11 includes, wherein the migration criteria are further based on an overall utilization level of the node on which the VM is executing, such that migration is triggered when the node utilization is below a threshold.

In Example 13, the subject matter of Examples 9-12 includes, wherein determining the migration plan comprises: identifying multiple VMs on the first node that satisfy the migration criteria; selecting the second node from the plurality of nodes based on the second node having available resources to accommodate the multiple VMs.

In Example 14, the subject matter of Examples 9-13 includes, wherein nodes in the plurality of nodes are organized into clusters based on common hardware configurations, and wherein the migration criteria are specific to a cluster.

In Example 15, the subject matter of Example 14 includes, wherein a first cluster contains nodes optimized for computationally intensive workloads, and wherein the migration criteria for the first cluster prioritizes CPU and memory utilization metrics.

In Example 16, the subject matter of Examples 9-15 includes, wherein the utilization metrics for the plurality of VMs are received from VM agents executing on at least some of the plurality of VMs and from node agents executing on the nodes on which the plurality of VMs are executing.

Example 17 is a computer-readable storage medium, storing instructions thereon, which, when executed by one or more processors, cause operations to be performed, the operations comprising: receiving utilization metrics for a plurality of VMs provisioned for and executing on a node of the plurality of nodes, and utilization metrics for the plurality of nodes; analyzing the received utilization metrics for the plurality of VMs and nodes to identify one or more VMs that satisfy migration criteria based on underutilization of resources; determining, based on the analyzing, a migration plan for migrating the identified one or more VMs from their respective nodes to one or more other nodes; and transmitting instructions to implement the migration plan, wherein the instructions cause migration of at least one identified VM from a first node to a second node.

In Example 18, the subject matter of Example 17 includes, wherein the migration criteria are further based on an overall utilization level of the node on which the VM is executing, such that migration is triggered when the node utilization is below a threshold.

In Example 19, the subject matter of Examples 17-18 includes, wherein nodes in the plurality of nodes are organized into clusters based on common hardware configurations, and wherein the migration criteria are specific to a cluster.

In Example 20, the subject matter of Examples 17-19 includes, wherein the utilization metrics for the plurality of VMs are received from VM agents executing on at least some of the plurality of VMs and from node agents executing on the nodes on which the plurality of VMs are executing.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 5:
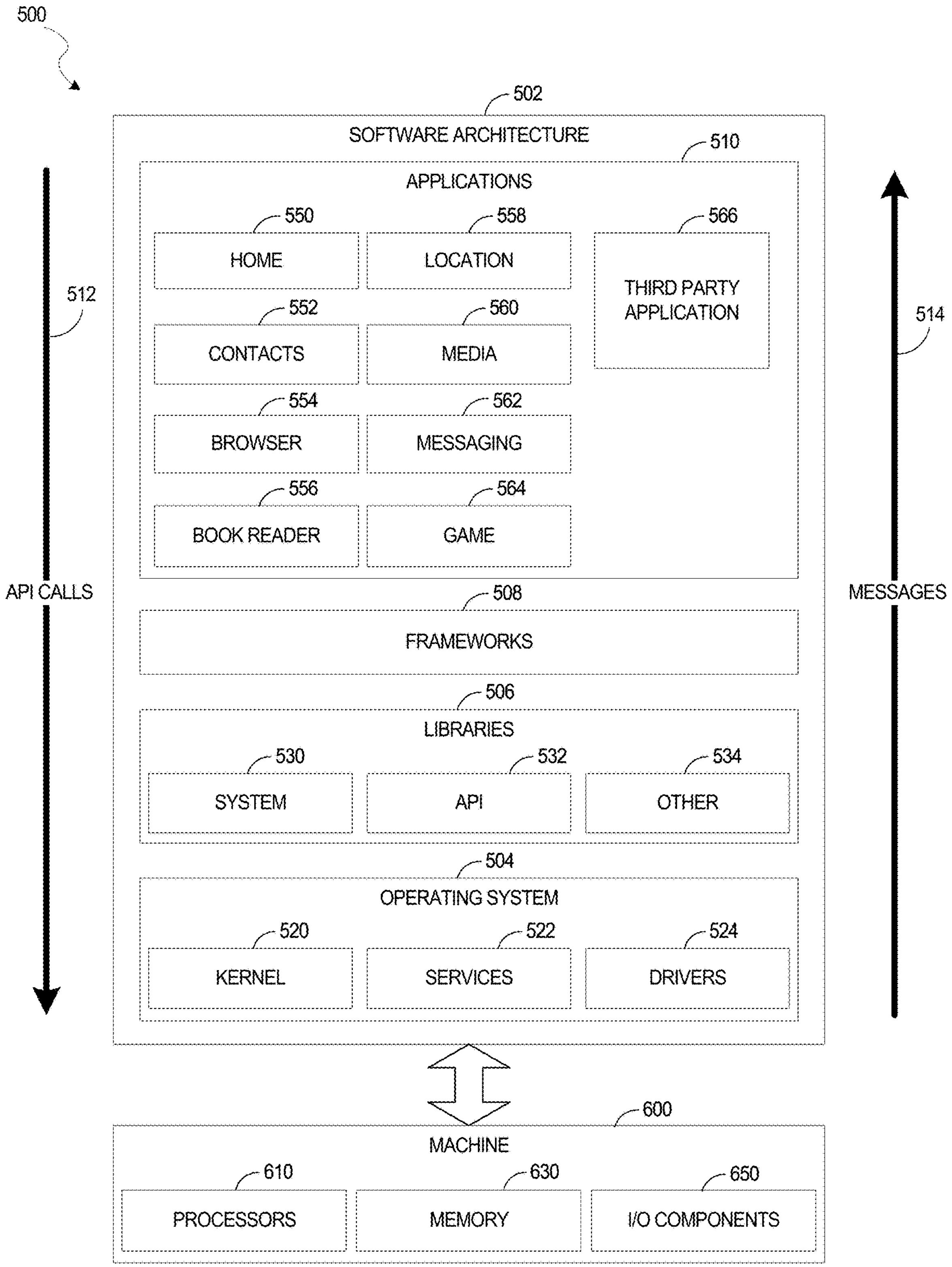
FIG. 5 is a block diagram illustrating a representative software architecture, which may be used in conjunction with various hardware architectures herein described.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionalities. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various GUI functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
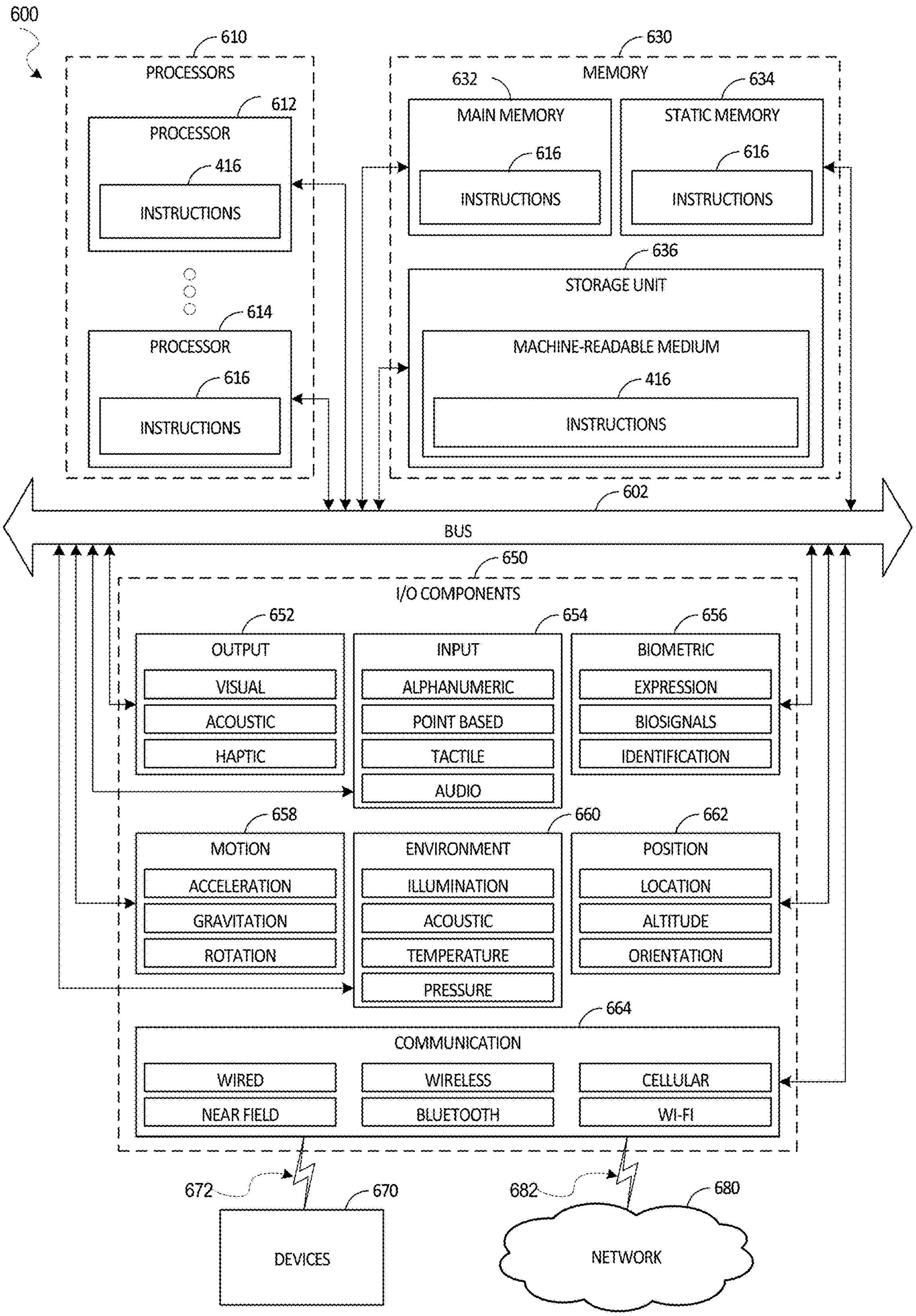
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the method 400 of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (e.g., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., HTTP). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A computer-implemented method for managing virtual machines (VMs) executing across a plurality of nodes in a data center, the method comprising:

receiving, by a VM balancing service executing on a server, utilization metrics for each of a plurality of VMs individually, the plurality of VMs provisioned for and executing on the plurality of nodes, and utilization metrics for each of one or more clusters of nodes within the plurality of nodes individually;

analyzing, by the VM balancing service, the utilization metrics for each of the plurality of VMs individually to flag one or more individual VMs that are underutilized;

analyzing, by the VM balancing service, the utilization metrics for each of the one or more clusters individually to identify one or more clusters that are underutilized;

generating, by the VM balancing service, a migration plan for migrating one or more VMs flagged as underutilized to one or more nodes within one or more clusters identified as underutilized; and transmitting, by the VM balancing service, instructions to implement the migration plan, wherein the instructions cause migration of the one or more VMs flagged as underutilized to the or more nodes within the one or more clusters identified as underutilized.

2. The computer-implemented method of claim 1, wherein analyzing the received utilization metrics for the plurality of VMs comprises:

comparing, for each of the plurality of VMs, the received utilization metrics for the VM against expected utilization metrics for the VM based on specifications of the virtual machine; and identifying a VM as satisfying migration criteria when the received utilization metrics for the VM deviate from the expected utilization metrics for the VM beyond a threshold amount.

3. The computer-implemented method of claim 1, wherein analyzing the received utilization metrics for the plurality of VMs comprises:

inputting the received utilization metrics for an individual VM into a pre-trained machine learning model;

generating, by the pre-trained machine learning model, a migration score indicating a likelihood that the individual VM should be migrated to a new node based on the inputted utilization metrics;

identifying the individual VM as satisfying migration criteria when the migration score exceeds a threshold value; and wherein the pre-trained machine learning model is trained using historical utilization metrics for a plurality of VMs having a same configuration and node configuration as the individual VM.

4. The computer-implemented method of claim 3, wherein the migration criteria are further based on an overall utilization level of the node on which the VM is executing, such that migration is triggered when the node utilization is below a threshold.

5. The computer-implemented method of claim 1, wherein determining the migration plan comprises:

identifying multiple VMs on a first node that satisfy migration criteria; and selecting a second node from the plurality of nodes based on the second node having available resources to accommodate the multiple VMs.

6. The computer-implemented method of claim 1, wherein migration criteria are specific to the identified one or more clusters.

7. The method of claim 6, wherein a first cluster contains nodes optimized for computationally intensive workloads, and wherein the migration criteria for the first cluster prioritizes CPU and memory utilization metrics.

8. The computer-implemented method of claim 1, wherein the utilization metrics for the plurality of VMs are received from VM agents executing on at least some of the plurality of VMs and from node agents executing on the nodes on which the plurality of VMs are executing.

9. A system for managing virtual machines (VMs) executing across a plurality of nodes in a data center, comprising operations for:

receiving, by a VM balancing service executing on a server, utilization metrics for each of a plurality of VMs individually, the plurality of VMs provisioned for and executing on the plurality of nodes, and utilization metrics for each of one or more clusters of nodes within the plurality of nodes individually;

analyzing, by the VM balancing service, the utilization metrics for each of the plurality of VMs individually to flag one or more individual VMs that are underutilized;

analyzing, by the VM balancing service, the utilization metrics for each of the one or more clusters individually to identify one or more clusters that are underutilized;

generating, by the VM balancing service, a migration plan for migrating one or more VMs flagged as underutilized to one or more nodes within one or more clusters identified as underutilized; and transmitting, by the VM balancing service, instructions to implement the migration plan, wherein the instructions cause migration of the one or more VMs flagged as underutilized to the or more nodes within the one or more clusters identified as underutilized.

10. The system of claim 9, wherein analyzing the received utilization metrics for the plurality of VMs comprises:

comparing, for each of the plurality of VMs, the received utilization metrics for the VM against expected utilization metrics for the VM based on specifications of the virtual machine; and identifying a VM as satisfying migration criteria when the received utilization metrics for the VM deviate from the expected utilization metrics for the VM beyond a threshold amount.

11. The system of claim 9, wherein analyzing the received utilization metrics for the plurality of VMs comprises:

inputting the received utilization metrics for an individual VM into a pre-trained machine learning model;

generating, by the pre-trained machine learning model, a migration score indicating a likelihood that the individual VM should be migrated to a new node based on the inputted utilization metrics;

identifying the individual VM as satisfying migration criteria when the migration score exceeds a threshold value; and wherein the pre-trained machine learning model is trained using historical utilization metrics for a plurality of VMs having a same configuration and node configuration as the individual VM.

12. The system of claim 11, wherein the migration criteria are further based on an overall utilization level of the node on which the VM is executing, such that migration is triggered when the node utilization is below a threshold.

13. The system of claim 9, wherein determining the migration plan comprises:

identifying multiple VMs on a first node that satisfy migration criteria; and selecting a second node from the plurality of nodes based on the second node having available resources to accommodate the multiple VMs.

14. The system of claim 9, wherein nodes in the plurality of nodes are organized into clusters based on common hardware configurations, and wherein migration criteria are specific to a cluster.

15. The system of claim 14, wherein a first cluster contains nodes optimized for computationally intensive workloads, and wherein the migration criteria for the first cluster prioritizes CPU and memory utilization metrics.

16. The system of claim 9, wherein the utilization metrics for the plurality of VMs are received from VM agents executing on at least some of the plurality of VMs and from node agents executing on the nodes on which the plurality of VMs are executing.

17. A computer storage medium, storing instructions thereon, which, when executed by one or more processors, cause operations to be performed, the operations comprising:

receiving, by a VM balancing service executing on a server, utilization metrics for each of a plurality of VMs individually, the plurality of VMs provisioned for and executing on the plurality of nodes, and utilization metrics for each of one or more clusters of nodes within the plurality of nodes individually;

analyzing, by the VM balancing service, the utilization metrics for each of the plurality of VMs individually to flag one or more individual VMs that are underutilized;

analyzing, by the VM balancing service, the utilization metrics for each of the one or more clusters individually to identify one or more clusters that are underutilized;

generating, by the VM balancing service, a migration plan for migrating one or more VMs flagged as underutilized to one or more nodes within one or more clusters identified as underutilized; and transmitting, by the VM balancing service, instructions to implement the migration plan, wherein the instructions cause migration of the one or more VMs flagged as underutilized to the or more nodes within the one or more clusters identified as underutilized.

18. The computer medium of claim 17, wherein migration criteria are further based on an overall utilization level of the node on which the VM is executing, such that migration is triggered when the node utilization is below a threshold.

19. The computer medium of claim 17, wherein nodes in the plurality of nodes are organized into clusters based on common hardware configurations, and wherein migration criteria are specific to a cluster.

20. The computer medium of claim 17, wherein the utilization metrics for the plurality of VMs are received from VM agents executing on at least some of the plurality of VMs and from node agents executing on the nodes on which the plurality of VMs are executing.

* * * * *